UNITED STATES PATENT OFFICE.

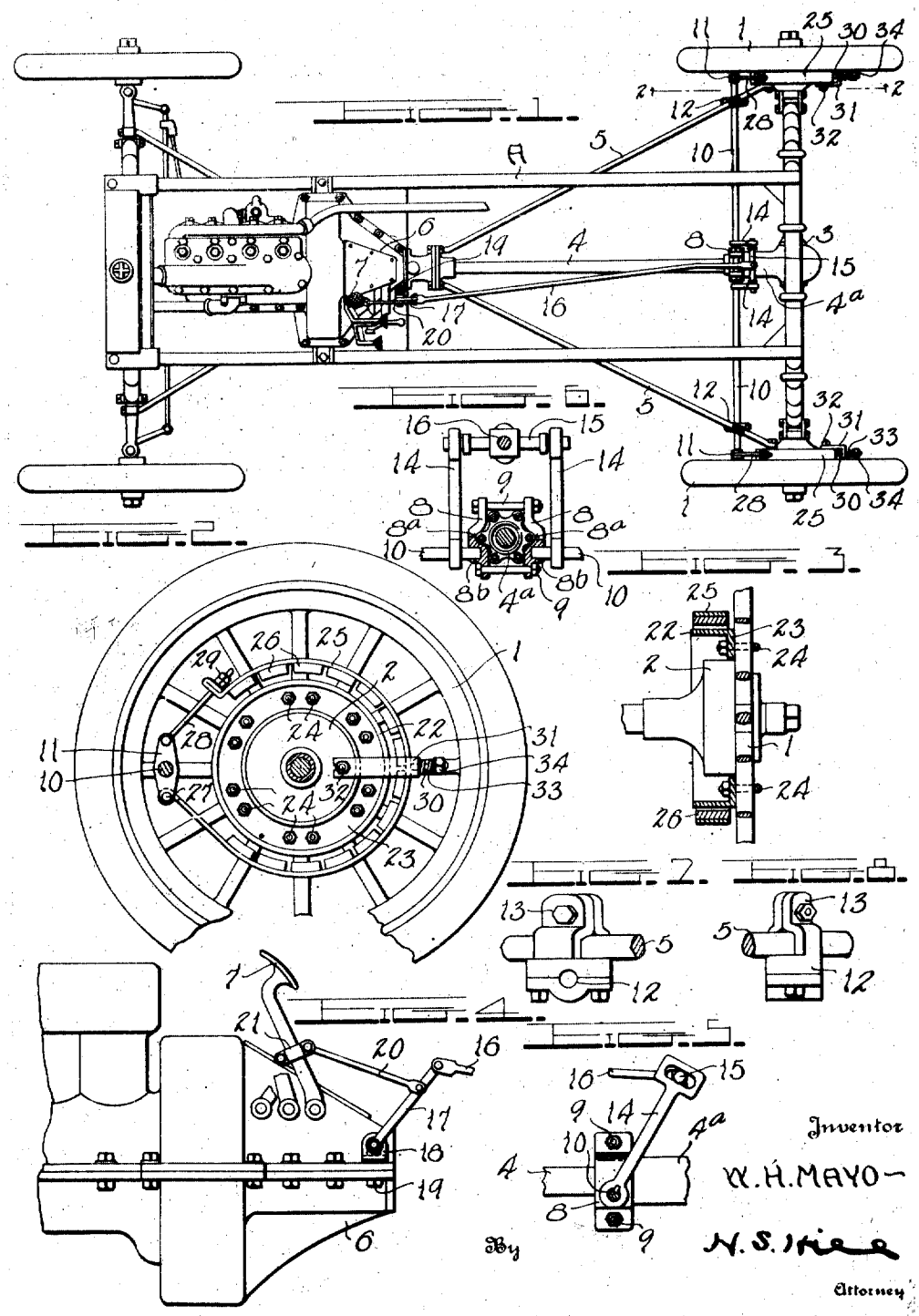
W. H. MAYO.
VEHICLE BRAKE ATTACHMENT.
APPLICATION FILED FEB. 4, 1916.
1,212,983.
Patented Jan. 16, 1917.
Inventor
W. H. MAYO
By N. S. Price
Attorney

WILLIAM H. MAYO, OF ROYALTON, VERMONT.

VEHICLE-BRAKE ATTACHMENT.

1,212,983.  Specification of Letters Patent.  Patented Jan. 16, 1917.

Application filed February 4, 1916. Serial No. 76,107.

*To all whom it may concern:*

Be it known that I, WILLIAM H. MAYO, a citizen of the United States, residing at Royalton, in the county of Windsor, State of Vermont, have invented a new and useful Vehicle-Brake Attachment; and I do hereby declare the following to be a full, clear, and exact description of the invention, such as will enable others skilled in the art to which it appertains to make and use the same.

The present invention relates to vehicle brakes, and more particularly to an attachment adapted to be applied to motor cars having the service brake upon the transmission for the purpose of changing the service brake to the rear wheels, the object of the invention being to provide a brake attachment of this character which can be applied to the car without making any changes in the construction thereof, and which utilizes the same brake pedal.

Further objects of the invention are to provide a brake attachment of this character which is comparatively simple and inexpensive in its construction, which can be readily mounted upon the motor vehicle as an attachment, and which will greatly improve the braking system by substituting a rear wheel service brake for a transmission service brake.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of the chassis and running gear of an automobile showing a braking system constructed in accordance with the invention applied thereto. Fig. 2 is an enlarged transverse sectional view through the rear axle, taken on the line 2—2 of Fig. 1. Fig. 3 is a transverse sectional view through one of the rear wheels and the brake drum and band carried thereby, showing the manner of applying the brake drum to the spokes of the wheel. Fig. 4 is an enlarged side elevation of the transmission case of the automobile engine, showing the manner of connecting the service brake pedal with the braking system. Fig. 5 is an enlarged side elevation of the crank arms and brake evener applied to the brake shafts. Fig. 6 is a front elevation thereof, portions of the supporting clip about the transmission shaft casing being broken away and shown in section. Fig. 7 is a side elevation of the brake shaft bearing applied to the radius rod. Fig. 8 is an end elevation thereof.

Corresponding and like parts are referred to in the following description and indicated in all the views of the drawing by the same reference characters.

The motor vehicle A to which the brake attachment is applied is shown in a fragmentary manner, all those parts not necessary to illustrate the invention being omitted. The numerals 1 designate the rear wheels which are provided with the usual brake drums 2 within which the conventional expanding brake shoes are mounted, the said brake drums and brake shoes constituting what is termed the emergency brake. The rear axle housing 3 is connected at its middle portion to the drive shaft housing 4, while the end portions of the rear axle housing are connected by the rear radius rods 5 to the transmission case 6. The usual service brake pedal 7 is mounted upon one side of the transmission case 6 and controls a conventional form of brake band which ordinarily operates upon the transmission, being known as a transmission service brake. The above parts are all of the well known and conventional construction, being found in what is known to the trade as a Ford automobile.

Complemental bearing blocks 8 are clamped against opposite sides of the drive shaft roller bearing housing $4^a$, said bearing blocks being suitably notched at $8^a$ to fit against the housing, and the ends of the blocks being connected by the respective transverse clamping bolts 9. These blocks 8 are provided with bearings $8^b$ within which the inner ends of oppositely extending and independent brake shafts 10 are journaled. The outer ends of the said brake shafts have cross heads 11 rigidly applied to the extremities thereof, and are journaled within bearings 12 which are detachably applied by means of the clips 13 to the radius rods 5.

Rigid with the inner end of each of the brake shafts 10 and projecting upwardly therefrom at a point adjacent the clip 8 is a crank arm 14, the upper ends of the crank arms being loosely connected by a transverse evener 15 which extends across the top of the drive shaft housing. The middle of the evener 15 is connected to the rear end of a special brake rod 16 which extends forwardly and has its front end pivotally connected to the upper end of an auxiliary lever 17, said lever being pivotally mounted at its lower end upon a bracket 18 which is secured to the transmission case 6 by one of the usual bolts 19. This auxiliary lever 17 is connected by a short link 20 to a clip 21 which is applied to the transmission brake pedal 7. The usual transmission brake band can be loosened so that it will be inoperative, and when the brake pedal 7 is pushed forward the auxiliary lever 17 will be operated and the special brake rod 16 caused to rotate the brake shafts 10.

Auxiliary brake drums 22 which surround the emergency brake drums 2 are applied to the rear wheels 1. These auxiliary brake drums are provided with inwardly extending flanges 23 which fit against the rear wheels and provide just a sufficient amount of clearance to fit over the emergency brake drums 2. These flanges 23 are connected by suitable clips 24 to the spokes of the rear wheels, said clips preferably engaging alternate spokes. Extending around the special auxiliary brake drums 22 are steel brake bands 25 which have the usual brake band lining 26 applied thereto. One end of each of the brake bands 25 is pivotally connected at 27 to one end of the cross head 11, and adjustably connected by a bolt 28 to the opposite end of the said cross head 11. A nut 29 which is applied to the bolt 28 admits of the brake band being adjusted, and the brake band is normally loose upon the brake drum, although when the brake shaft 10 is rotated the cross head 11 serves to draw the brake band tightly around the brake drum so that it will firmly grip the latter and either retard rotation of the rear wheel or completely lock the same against rotation. The middle portions of the brake bands 25 are provided with outwardly extending pins 30 which pass through openings in angular brackets 31 secured in position by the brake shoe supporting bolt 32 which is already upon the vehicle. A small coil spring 33 surrounds the projecting end of each pin 30 so as to be interposed between the bracket 31 and a nut 34 upon the pin. These springs serve to normally hold the brake bands away from and out of engagement with the brake drums, although when the brake shafts are rotated to apply the brakes, the action of the springs is overcome and the brake bands drawn tightly around the brake drums.

This device is adapted to be applied as an attachment to what is ordinarily known as the Ford automobile and enables a service brake acting directly upon the rear wheels to be used instead of the usual transmission service brake, the former being much more satisfactory since it gives quicker and more direct results and eliminates the wear and tear upon the transmission gearing and differential gearing which is incident to the use of a transmission service brake.

Having thus described the invention, what I claim as new and desire to secure by Letters Patent, is:—

1. A service brake attachment for automobiles of the Ford type which are characterized by a foot pedal operated service brake acting upon the transmission and an emergency brake including standard brake drums on the rear wheels, said brake attachment including auxiliary brake drums fitted over the standard brake drums and centered upon the wheels thereby, brake bands for the auxiliary brake drums, an auxiliary lever mounted upon the transmission case, an operative connection between the auxiliary lever and the brake bands, and an operative connection between the auxiliary lever and the standard service brake foot pedal.

2. A service brake attachment for automobiles of the Ford type which are characterized by a foot pedal operated service brake acting upon the transmission and an emergency brake including standard brake drums on the rear wheels, said brake attachment including auxiliary brake drums fitted upon the standard brake drums and centered upon the wheels thereby, a detachable bearing clip clamped upon the drive shaft housing, bearing clips clamped upon the radius rods, brake shafts journaled upon the bearing clips, brake bands applied to the auxiliary brake drums and operatively connected to the brake shafts, and an operative connection between the brake shafts and the standard service brake foot pedal.

In testimony whereof I have signed my name to this specification in the presence of two subscribing witnesses.

WILLIAM H. MAYO.

Witnesses:
JAMES F. WATERMAN,
MYRON J. BUCK.